US008819131B2

(12) United States Patent
Hebert et al.

(10) Patent No.: US 8,819,131 B2
(45) Date of Patent: Aug. 26, 2014

(54) TRACING OF COLLABORATIVE WORKFLOWS

(75) Inventors: Cedric R. J. Hebert, Mougins (FR); Laurent Y. Gomez, Le Cannet (FR); Frederic Montagut, Antibes (FR); Henrik Plate, Nice (FR); Cedric S. P. Ulmer, Nice (FR)

(73) Assignee: SAP AG, Walldorf (DE)

( * ) Notice: Subject to any disclaimer, the term of this patent is extended or adjusted under 35 U.S.C. 154(b) by 1482 days.

(21) Appl. No.: 12/058,583

(22) Filed: Mar. 28, 2008

(65) Prior Publication Data
US 2008/0256172 A1    Oct. 16, 2008

(30) Foreign Application Priority Data
Mar. 30, 2007 (EP) .................................... 07290399

(51) Int. Cl.
    *G06F 15/16*  (2006.01)
    *H04L 12/24*  (2006.01)
    *H04L 29/06*  (2006.01)

(52) U.S. Cl.
    CPC .......... *H04L 41/0213* (2013.01); *H04L 41/046* (2013.01); *H04L 63/0254* (2013.01); *H04L 63/101* (2013.01); *H04L 41/0273* (2013.01); *H04L 41/0846* (2013.01)
    USPC ............................ 709/204; 709/205; 709/206

(58) Field of Classification Search
    CPC .............. H04L 41/0213; H04L 41/046; H04L 63/0254; H04L 63/101; H04L 41/0273; H04L 41/0846; H04L 41/0853; H04L 51/14; H04L 51/26; H04L 65/1046; H04L 65/1063; H04L 67/02; H04L 67/16; H04L 69/32
    USPC ........................................................ 709/204
    See application file for complete search history.

(56) References Cited

U.S. PATENT DOCUMENTS

| 6,125,382 | A  | * | 9/2000  | Brobst et al. ................... 718/102 |
| 6,260,057 | B1 | * | 7/2001  | Eykholt et al. ................. 718/102 |
| 6,397,191 | B1 | * | 5/2002  | Notani et al. ..................... 705/9 |
| 6,832,238 | B1 | * | 12/2004 | Sharma et al. ................. 709/201 |
| 6,862,573 | B2 | * | 3/2005  | Kendall et al. .................... 705/7 |
| 7,080,119 | B2 | * | 7/2006  | Felt et al. ....................... 709/203 |

(Continued)

FOREIGN PATENT DOCUMENTS

WO    WO-2004013784 A2    2/2004

OTHER PUBLICATIONS

"International Application Serial No.07290399.0, Extended European Search Report mailed Oct. 16, 2007", 16 pgs.

(Continued)

*Primary Examiner* — Karen Tang
(74) *Attorney, Agent, or Firm* — Schwegman Lundberg & Woessner, P.A.

(57) ABSTRACT

Embodiments include a system for tracing a collaborative workflow. The system includes an event collector and a transition engine. The event collector may be configured to receive data that represents an event of the collaborative workflow. The collaborative workflow has a local workflow part and a global workflow part. The transition engine may be configured to compute a new instance state of a model of the collaborative workflow. The new instance state represents an instance of the collaborative workflow obtained through the event of the collaborative workflow. The new instance state complies with rules of a local model of the local workflow part and with rules of a global model of the global workflow part.

21 Claims, 5 Drawing Sheets

(56) References Cited

U.S. PATENT DOCUMENTS

| | | | | |
|---|---|---|---|---|
| 2002/0065701 | A1* | 5/2002 | Kim et al. | 705/9 |
| 2003/0204740 | A1* | 10/2003 | Shapiro et al. | 713/200 |
| 2003/0236923 | A1* | 12/2003 | Jeyaraman et al. | 709/318 |
| 2004/0215473 | A1* | 10/2004 | Bhogi et al. | 705/1 |
| 2005/0027585 | A1* | 2/2005 | Wodtke et al. | 705/9 |
| 2006/0031388 | A1* | 2/2006 | Tankov et al. | 709/217 |
| 2007/0033079 | A1* | 2/2007 | Rits et al. | 705/7 |

OTHER PUBLICATIONS

"Workflow Management Coalition Terminology & Glossary", *Workflow Management Coalition Specification*, XX, XX, vol. WFMC-TC-1011, No. 30, XP007900584, (Feb. 1999), 65 pages.

Chebbi, Issam, et al., "The view-based approach to dynamic inter-organizational workflow cooperation", *Data & Knowledge Engineering*, North Holland. vol. 56, No. 2, XP005173377 ISSN: 0169-023X, (Feb. 2006), 139-173.

Craig, M, "Getting Started with Oracle Workflow 9i/2.6.2 Business Event System and Oracle 9i Advanced Queuing", *Oracle White Paper*, [online] XP007902964, Retrieved and from the Internet: Sep. 12, 2007 <URL:http://www.oracle.com/technology/products/ias/workflow/release262/workflow_wp_bes.pdf>, (Nov. 2001), 1-31.

Geppert, Andreas, et al., "Event-based Distributed Workflow Execution with EVE", *Middleware. IFIP International Conference on Distributed Systems Platforms and Open Distributed Processing*, XX, XX, XP008054523., (Sep. 1998), 427-442.

Geppert, Andreas, et al., "Logging and Post-Mortem Analysis of Workflow Executions Based on Event Histories", *Lecture Notes in Computer Science*, Springer Verlag, Berlin, DE, vol. 1312, XP009089427. ISSN: 0302-9743, (Jun. 26, 1997), 67-82.

Geppert, Andreas, et al., "Workflow Specification and Event-Driven Workflow Execution", *Informatik-Informatique-Magazine of the Swiss Federation of Information Processing Societies*, [Online]No. 2/1998, Apr. 1998. XP002450936 CH ISSN: 1420-6579, Retrieved from the internet: Sep. 12, 2007 <URL:http://www.svifsi.ch/revue/pages/issues/n982/no982.html>, (Apr. 1998), 29-34.

Kappel, G, et al., "Coordination in Workflow Management Systems—A Rule-Based Approach", *Coordination Technology for Collaborative Applications: Organization, Processes, and Agents* Springer-Verlag Berliln, Germany 1998, XP009089516, ISBN: 3-540-64170-X, (1998), 99-119.

Koksal, Pinar, et al., "History Management in Workflow Systems", *Advances in Computer and Information Sciences, Proceedings of ISCIS. International Symposium*, X, XX, No. 13th, XP009088251, (Oct. 26, 1998), 254-261.

Muth, Peter, et al., "Workflow History Management in Virtual Enterprises using a Light-Weight Workflow Management System", *Research Issues on Data Engineering : Information Technology for Virtual Enterprises, 1999, Ride-Ve '99. Proceedings., Ninth International Workshop on Sydney*, NSW, Australia, Mar. 23, 1999, Los Alamitos, CA, USA, IEEE Comput. Soc, US., XP010326296, ISBN: 0-7695-0119-2., (Mar. 23, 1999), 148-155.

Schulz, Karsten, et al., "Architectural Issues for Cross-Organizational B2B Interactions", *Architectural issues for cross-organizational B2B interactions Proceedings of the 21th International Conference on Distributed Computing Systems. ICDCS 2001*. Mesa, AZ, Apr. 16-19, 2001, International Conference on Distributed Computing Systems, New York,, XP009089323, ISBN: 0-7695-1077-9, (Sep. 16, 2001), 79-87.

Schulz, Karsten, et al., "Facilitating cross-organizational workflows with a workflow view approach", *Data & Knowledge Engineering*, North-Holland, vol. 51 No. 1, XP009066228, ISSN: 0169-023X, (Oct. 2004), 109-147.

Van Der Aalst, Wil, et al., "The P2P Approach to Interorganizational Workflows", *Advanced Information Systems Engineering. 13th International Conference, Caise 2001. Proceedings (Lecture Notes in Computer Science* vol. 2068) Springer-Verlag Berlin, Germany, XP009089451, ISBN: 3-540-42215-3, (2001), 140-156.

Zur Muehlen, Michael, et al., "Workflow-based Process Monitoring and Controlling-Technical and Organizational Issues", *System Sciences, 2000. Proceedings of the 33rd Annual Hawaii International Conference on Jan. 4-7, 2000* Piscataway, NJ, USA, IEEE, XP010545465, ISBN: 0-7695-0493-0, (Jan. 4, 2000), 1972-1981.

"ActiveBPEL Designer User's Guide", *Version 5.0.1 Active Endpoints, Inc.*, (Mar. 2008), 554 pgs.

"Open Source: The ActiveBPEL Community Edition Engine", [Online]. Retrieved from the Internet: <URL: http://www.activevos.com/community-open-source.php>, (Jun. 16, 2008), 2 pgs.

Wikipedia, "Buisness Process Execution Language", [Online]. Retrieved from the Internet: <URL: http://en.wikipedia.org/wiki/Business_Process_Execution_Language>, (Jun. 16, 2008), 4pgs.

Wikipedia, "Microsoft PowerPoint", [Online]. Retrieved from the Internet: <URL: http://en.wikipedia.org/wiki/powerpoint>, (Jun. 16, 2008), 4 pgs.

* cited by examiner

TRACING OF COLLABORATIVE WORKFLOWS

CLAIM OF PRIORITY

The present patent application claims the priority benefit of the filing date of European Application (EPO) No. 07290399.0 filed Mar. 30, 2007, the entire content of which is incorporated herein by reference.

TECHNICAL FIELD

Embodiments generally relate to electronic data processing and more specifically to tracing of data processes and data exchanges in a distributed computer system.

BACKGROUND

In the last years the field of electronic data processing has seen a rapid development. As a part of the development, more and more processes in enterprises or organizations have been automated. This includes processes that involve a participation of different partners or entities such as enterprises. Such processes can be described as collaborative processes. A description of a collaborative process at a business level is called a collaborative workflow. A collaborative workflow can be described by using a set of tasks that may be related to each other.

Participants in a collaborative workflow may have a supplier-customer relationship or may be competitors. Therefore, each participant of a collaborative workflow may have certain conditions for participating in the collaborative workflow. The conditions may relate for example to keeping certain internal process details private or to complying with general security requirements.

SUMMARY

An execution of a collaborative workflow may be checked for different reasons. A prototype of the collaborative workflow may be set up for a proof of concept. For this, tracing of an instance of the collaborative workflow that may be a prototype may be used. Furthermore, an established collaborative workflow may be checked for a proof of execution or for monitoring the progress. Results of such a check may be used to improve or optimize the workflow. Furthermore, tracing instances of an established workflow may be used to audit collaborative processes and to identify failures of participating entities.

Embodiments may be used for tracing a collaborative workflow across different participants complying with conditions of the different participants relating to privacy and security requirements.

One embodiment is a system for tracing a collaborative workflow. The system reflects a distributed architecture to trace a collaborative workflow and to comply with the conditions. A participant of the collaborative workflow may use the system inside its secure domain and trace a collaborative workflow according to local criteria and according to global criteria. The local criteria are defined by a local model of the collaborative workflow and may include process details that are considered as private by the participant. As the system is inside the secure domain and may be authorized to access such private details. The global criteria are defined by a global model of the collaborative workflow that is known by the participants of the collaborative workflow. Events relating to the global model are received from other participants from outside the secure domain of the participant using the system. From the perspective of the other participants, the system may be an outside system and have no access to private data of the other participants, thus protecting also the data of the other participants.

The system allows for a tracing of the collaborative workflow that is detailed and at the same time complying with privacy and security requirements. The system is efficient with respect to data communication resources and data processing resources compared to a centralized system that would receive and process data from all participants. Furthermore, using the system may not necessarily require a trusted further party to which the participants would have to send private data. This leads to an increase of security. Furthermore, using a local model of the collaborative workflow may prevent any leak of information about internal processes to other participants of the collaborative workflow. The system may be protected by highly developed standard security means. This increases the security of a participant using the system. The global model may be used to discuss and define the collaborative workflow with the other participants as far as the other participants are concerned.

A further embodiment is a method for tracing a collaborative workflow. The method may be used by a participant of a collaborative workflow to trace the collaborative workflow and to comply with privacy and security requirements. Using the method the participant may have complete access to its own data, may protect its own data by keeping its data private, and may protect private data of other participants by not accessing them. Data processing involves a local model of the collaborative workflow and a global model of the collaborative workflow.

Therefore, the method is secure and efficient with respect to data exchange and data processing.

A further embodiment is a computer program product for tracing a collaborative workflow that shares characterizing features with the method for tracing a collaborative workflow.

DETAILED DESCRIPTION

The following description of examples includes details for illustrating embodiments and is not intended to limit the scope of the embodiments or to be exhaustive. For purposes of explanation, specific details are set forth in order to provide a thorough understanding of example embodiments. A person skilled in the art may appreciate that further embodiments may be practiced with details that differ from the specific details.

Figure 1:
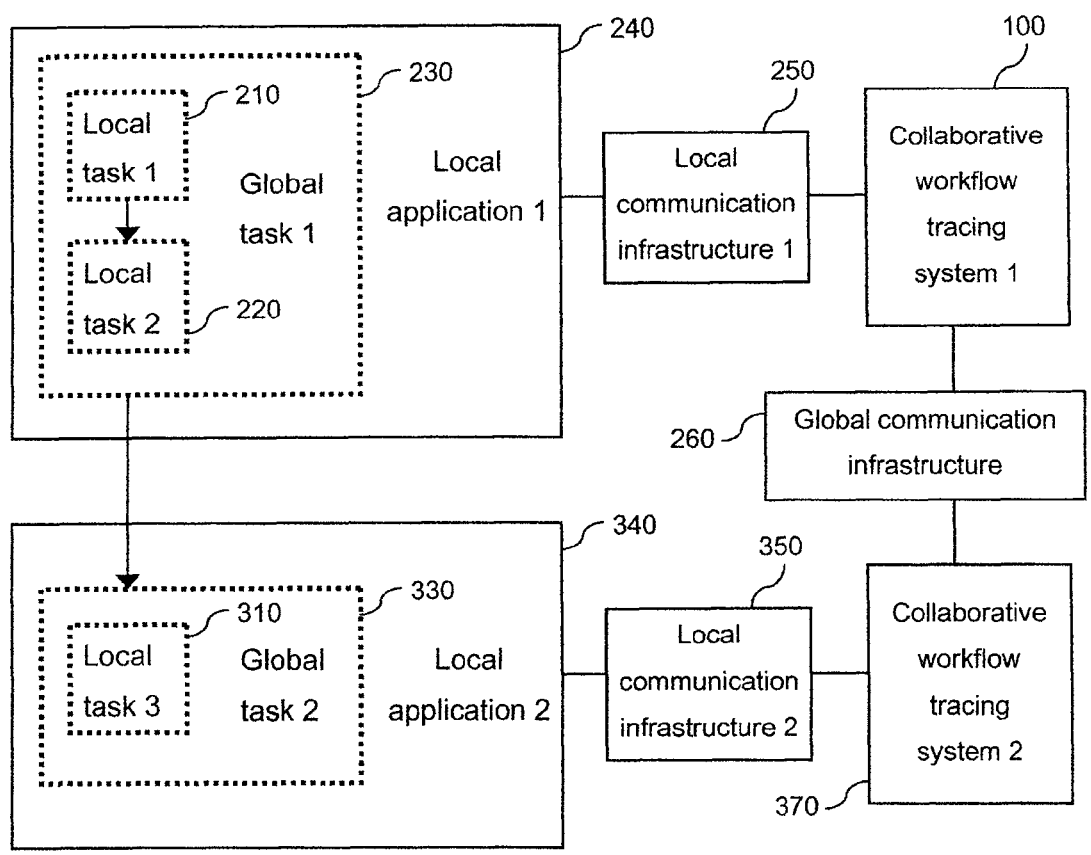
FIG. 1 is a block diagram of an example collaborative workflow and example collaborative workflow tracing system according to an embodiment.

FIG. 1 is a block diagram of an example collaborative workflow and example collaborative workflow tracing systems according to an embodiment. The collaborative workflow has two local workflow parts one of which includes local task 1 210 and local task 2 220. A further local workflow part includes local task 3 310. The collaborative workflow has further two global workflow parts that include global task 1 230 and global task 2 330. One local workflow part is running on a local application 1 240 that is communicatively coupled to a collaborative workflow tracing system 1 100 through a local communication structure 1 250. The other local workflow part is running on a local application 2 340 that is communicatively coupled to a collaborative workflow tracing system 2 370 through a local communication structure 2 350. A global communication infrastructure 260 provides a data exchange structure between the collaborative workflow tracing system 1 100 and the collaborative workflow tracing system 2 370.

In an example, the collaborative workflow may have local task 1 210 that represents a creation of a purchase request by an employee. The local task 2 220 may represent a review of the purchase request by a responsible manager that is determined based on the value of the purchase request. Such details may determine the local workflow part and may be specified by a local model of the collaborative workflow. The global task 1 230 may be a creation of a purchase order and may be a part of the global workflow part specified by a global model of the collaborative workflow. A participant using local application 1 240 may consider the details of how a purchase order is created according to the local model as private. In an example, a user of the local application 1 240 may want to keep the value ranges private that are used to determine the responsible manager. For the global model, it is the creation of the purchase order according to global task 1 210 that is relevant to a further participant that uses for example local application 2 340.

The purchase order may be sent to local application 2 340. This may be accomplished using a direct channel between the local application 1 240 and the local application 2 340. In a further example, this may be accomplished using the local communication structure 1 250, the global communication infrastructure 260, and the local communication structure 2 350. In an example, the global task 2 330 may be a processing of the purchase order and the local task 3 310 may be a processing of the purchase order by an employee that depends on the value of the purchase order. The format of the purchase order and the communication addresses that identify to where the purchase order is sent may be specified in the global model of the collaborative workflow.

The local application system 1 240 may be a computer system such as a personal computer (PC), a server, a plurality of servers configured to execute software programs, or a mainframe computer system. The local application system 1 240 may include a client and a server related according to a client-server architecture or may include one or more peer computers arranged in a peer-to-peer or distributed architecture. In a further example, the local application system 1 240 may include a plurality of individual computer systems that are connected by the Internet or by an intranet of an entity such as for example a company or an organization. The local application system 1 240 may run, for example by hosting and executing, an application that processes electronic data. The application may also include different application programs that provide together provide the functionality of the application. Generally, tasks of such an application may be considered as a unit that is separate and complete from a business process perspective. The local application system 2 340 may have a hardware and a software that are similar or different to the hardware and the software of the local application system 1 240.

The local communication infrastructure 1 250 may be an intranet of a company using the local application system 1 240. The local communication infrastructure 2 350 may be an intranet of a company using the local application system 2 340. The global communication infrastructure 260 may be the Internet or a communication infrastructure with a limited access by certain companies.

The collaborative workflow tracing system 1 100 may include as hardware a computer system such as a personal computer (PC), a server, a plurality of servers configured to execute software programs, or a mainframe computer system. The collaborative workflow tracing system 1 100 may include a client and a server related according to a client-server architecture or may include one or more peer computers arranged in a peer-to-peer or distributed architecture. In a further example, the collaborative workflow tracing system 1 100 may include a plurality of individual computer systems that are connected by the Internet or by an intranet of an entity such as for example a company or an organization.

The hardware of the collaborative workflow tracing system 1 100 may run, for example by hosting and executing, a program that configures the collaborative workflow tracing system 1 100 to have characterizing features. Units of the collaborative workflow tracing system 1 100 may include software units that represent encapsulated or distributed instructions. Such software units may be executed by the hardware of the collaborative workflow tracing system 1 100 and may provide functionality of the units. One or more units of the collaborative workflow tracing system 1 100 may be designed as web applications that may run for example on a standard web server or on a dedicated web server such as Jetty. Hardware and software of the collaborative workflow tracing system 2 370 may be similar or different from the hardware and software of the collaborative workflow tracing system 1 100. In a further example, the collaborative workflow tracing system 2 370 may differ from an embodiment, that is, the collaborative workflow tracing system 2 370 may not be according to an embodiment.

In a further example, an example collaborative workflow tracing systems according to an embodiment may be used in a different collaborative workflow. In the different collaborative workflow, a first participant may execute global task 1, a second participant may execute global task 2 followed by global task 3 that is executed again by the first participant. A third participant may execute global task 4 that follows global task 3. The third participant may use the example collaborative workflow tracing systems according to an embodiment in order to trace or follow the collaborative workflow. The third party may for example check if an instance of the collaborative workflow has been started already by the first participant and what is the current state of an instance of the collaborative workflow.

Figure 2:
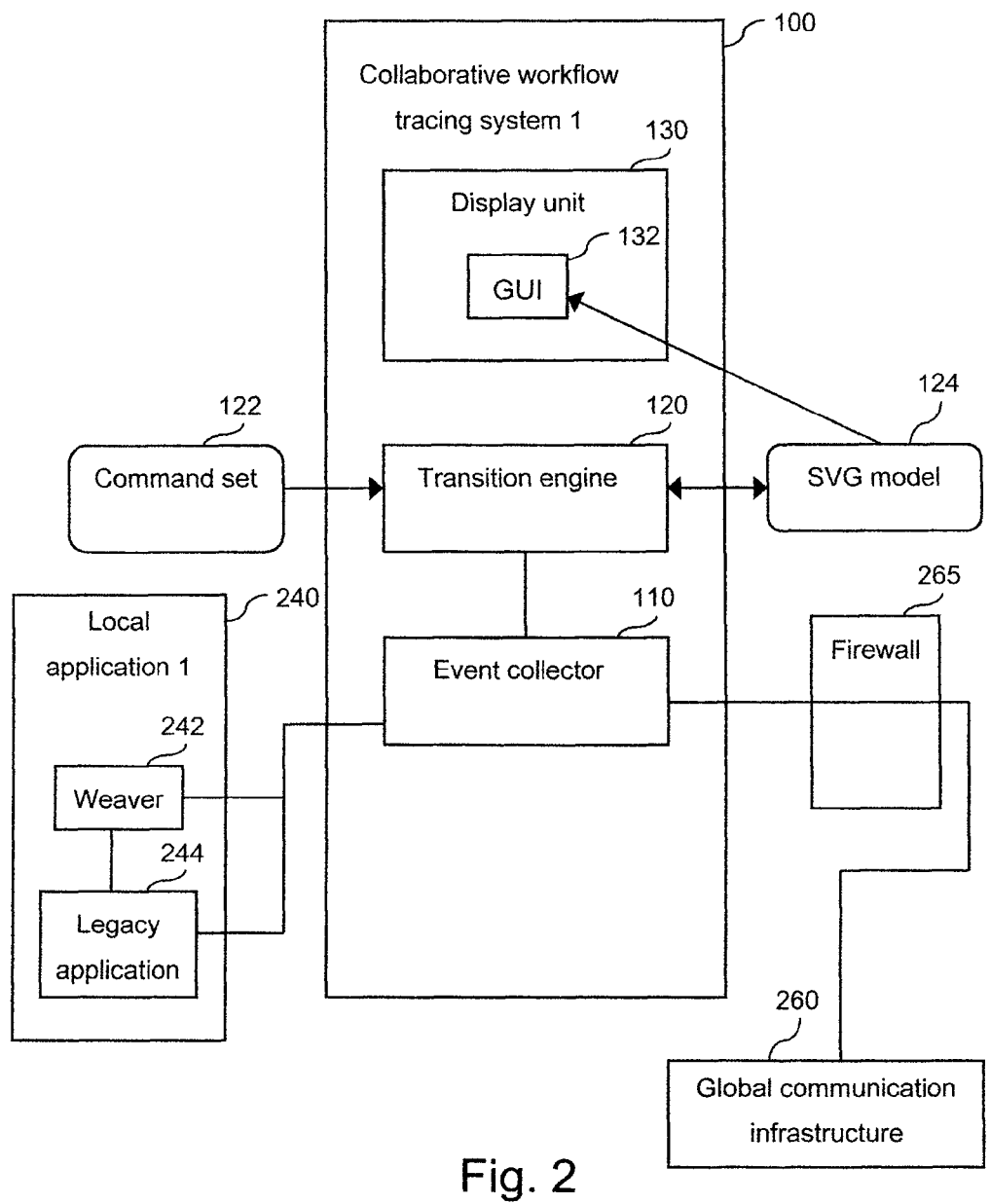
FIG. 2 is a block diagram of an example collaborative workflow tracing system, according to an embodiment, interacting with data resources and further systems.

FIG. 2 is a block diagram of an example collaborative workflow tracing system 1 100, according to an embodiment, interacting with data resources and further systems. The collaborative workflow tracing system 1 100 has as units an event collector 110, a transition engine 120, and a display unit 130 with a GUI 132. The transition engine 120 interacts with a command set resource 122 and a scalable vector graphic (SVG) model resource 124. The event collector 110 interacts with a weaver 242 and a legacy application 244 that are components of the local application system 1 240. The event collector 110 further interacts with the global communication infrastructure 260 through a firewall 265.

The event collector 110 is configured to receive data that represents an event of the collaborative workflow. The received data may be sent from the weaver 242, from the legacy application 244, or from a remote collector through the global communication infrastructure 260. According to the source of the data, the event is an event of a local workflow part or of a global workflow part. In an example, data received from the weaver 242 or from the legacy application 244 represents an event of the local workflow part and such a local event is modelled by the local model of the collaborative workflow. However, data received for example from a remote collector through the global communication infrastructure 260 represents an event of the global workflow part and such a global event is modelled by the global model of the collaborative workflow.

Generally, an event may be accomplished when for example a task of the workflow has been claimed or when a task of the workflow has been finished. Data representing a local event may be sent by different implementations from the local application 1 240. The legacy application 244 may send directly the data representing the local event, when for example the local workflow has a task of sending such data. In a further example, the data may be sent by coding added to the application through code weaving. In such a case the weaver 242 sends the data representing the local event. In a further example, a further component may analyse log data written by the legacy application 244 into a log file and sending the data when an event is detected from parsing periodically the log file. The data may be sent in a format of a hypertext transfer protocol (HTTP) get request in which case a proxy may be developed to transform the data into such a format.

Data representing a global event may be in a format according to a HTTPS get request. Such a format may be considered as a safe way of transmitting information so that a firewall may be configured to let such requests pass through. In a further example, the event collector 110 may also periodically send a request to one or more remote collectors that represent a message that no new events have been received. The one or more remote collectors may then check if a global event has been registered by them and accordingly send an update describing the global event. The event collector 110 may use an identifier with the message so that the one or more remote collectors know where to send the global event update to.

The event collector 110 transmits data representing an event of the collaborative workflow to the transition engine 120. The transition engine 120 is configured to compute a new instance state of a model of the collaborative workflow. The new instance state represents an instance of the collaborative workflow obtained through the event of the collaborative workflow. The new instance state complies with rules of a local model of the local workflow part and with rules of a global model of the global workflow part.

In an example, the transition engine 120 may be configured to determine first, if the event is an event of a local workflow part of the collaborative workflow or an event of a global workflow part of the collaborative workflow. According to the result different part of the command set resource 122 may be used. In a further example, such a determination if the event belongs to the local workflow part or the global workflow part may not be required. In a further example, such a determination may be computed by the event collector 110. In an example, the transition engine 120 is configured to compute the new instance state by accessing the command set resource 122 that has a mapping. The mapping relates the data representing the event of the collaborative workflow to a list of commands. The commands describe changes of an outdated instance state of the model of the collaborative workflow to the new instance state of the model of the collaborative workflow. Therefore, the transition engine 120 may search the command set resource, for example, a file for data that are identical to the received data or a part of the received data to find a match. A person skilled in the art will appreciate that such a search may be used to find also data that are substantially identical to the received data or a part of the received data. In an example, data may be searched that correspond to the received data according to certain correspondence rules that may for example ignore differences caused by using a different format for the received data. The transition engine 120 may use the mapping to obtain one or more commands that prescribe how to change the instance state currently stored in the SVG model resource 124.

In an example, the received data may represent an event of a finishing a specific task of a specific workflow instance. A mapping may identify such a task of a collaborative workflow and relate it to a change of a color of a box representing the task from red to green. The transition engine 120 may access a part of the SVG model resource 124, apply a change of the accessed part according to the identified commands and save the change. In an example, the SVG model resource 124 may be a file or a database system with one or more data base tables. In a further example, the model for describing the collaborative workflow may be different from the SVG model, for example, a business process enforcement language (BPEL) model may be used.

A person skilled in the art may appreciate that a collaborative workflow may be modelled using an identifier for the global workflow part, an identifier for the local workflow part, an identifier for a local event, an identifier for a global event, and an identifier for an instance of the collaborative workflow. Such identifiers may be used by the transition engine 120 to match received data representing an event and identify corresponding changes of a state of an instance of the collaborative workflow.

The display unit 130 may have a SVG renderer that has a graphical user interface (GUI) 132 to load the current SVG model resource and display it on an output device such as a monitor to a user. In a further example, a display unit may be absent from a workflow tracing system and instead periodically a log of changes of the SVG model resource 124 may be written. Such a log may be used for monitoring, for auditing or for analysis when a problem with an instance of the collaborative workflow occurs. The log may be used to identify a source of an error and possibly may be used for calculating compensations.

The event collector 110 may be further configured to send further data representing the event as an event of the global workflow part to a remote event collector in case that the event is an event of the local workflow part. In an example, the further data may be sent when the event of the local workflow part has a global correspondence, for example, by representing also a finishing of a global task in addition to representing a finishing of a local task. More specifically, a local event about which data have been received from the local application 240 may be transformed to a global event. Such a transformation may be done by the event collector 110 or by the transition engine 120. The transition may include removing certain details from the received data and sending the filtered version of the received data to one or more remote event collectors. The remote event collectors may be a unit of a collaborative workflow tracing system that is also according to an embodiment. In an example, the further data, that is the filtered version of the received data, complies with local security requirements. This may be done by for example removing names or identifiers of employees that have been involved in an execution of a task. It may also involve transforming a more specific identification of a role of a responsible employee according to a local model of the collaborative workflow to a more general role according to a global model of the collaborative workflow.

In an example, the event collector 110 is configured to send a request for data representing a missing event of the collaborative workflow to a remote event collector. This may be done in case that the event of the collaborative workflow is configured to identify the missing event of the collaborative workflow. More specifically, the received data may represent an event that follows a prior event according to the collaborative workflow of which no data have been received previously. In such a case the prior event is considered a missing event and the event collector may request that the data representing the missing event are sent again. The collaborative workflow may allow for a precise identification of the missing event. The missing event may be a local event or a global event. The collaborative workflow may allow for an identification of the legacy application 242 responsible for processing the task related to the missing event. In such a case the event collector 110 may send a request for data representing the missing event to the legacy application 242. The collaborative workflow may allow for an identification of the remote collector responsible for sending data representing the missing event. In case that more than one missing event is identified, one or more requests for data may be sent to one or more remote collectors. In a further example, the collaborative workflow tracing system 1 100 may accept a missing event and instead try to update the SVG model resource 124 as if the missing event had been registered.

Figure 3:
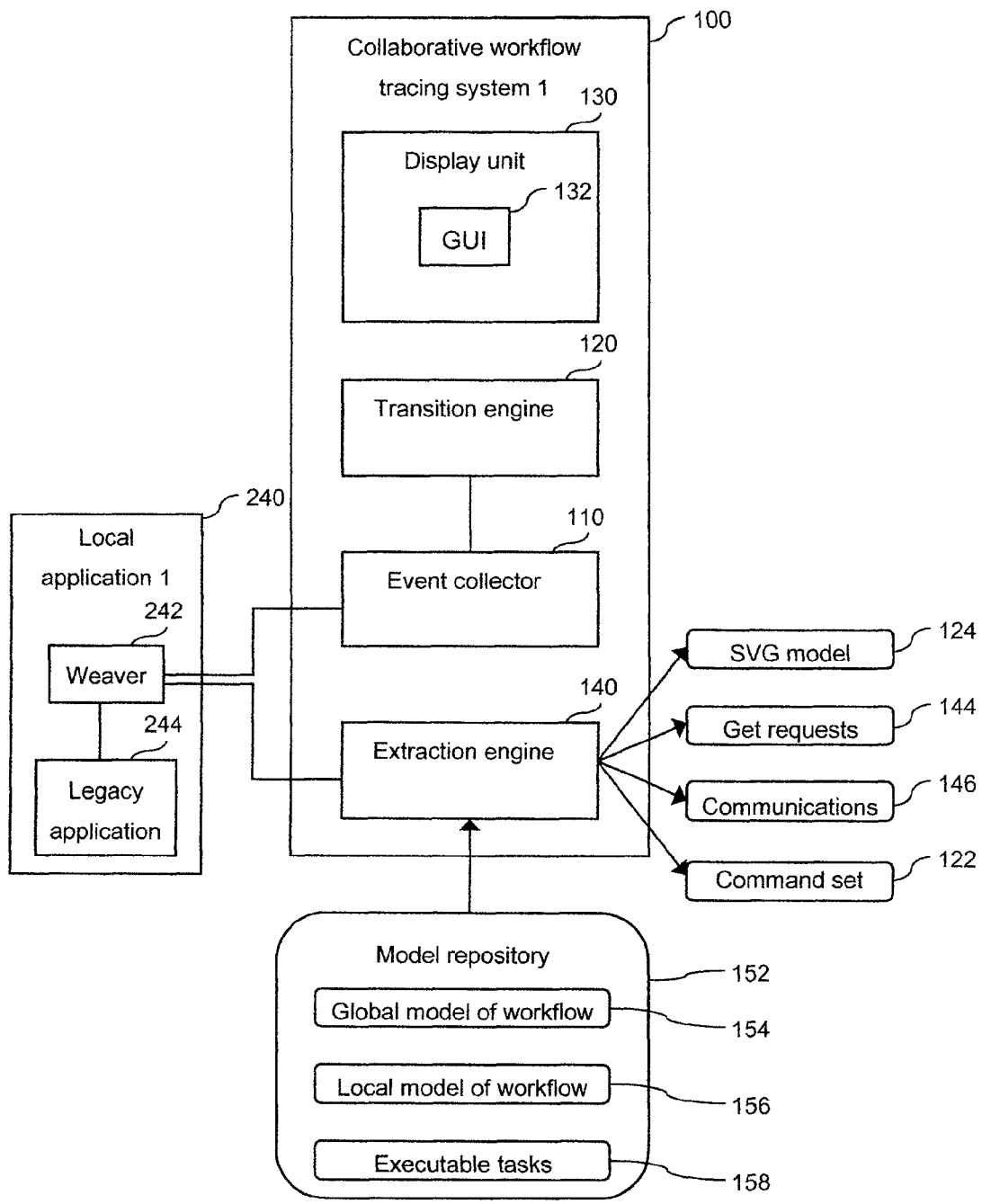
FIG. 3 is a block diagram of an example collaborative workflow tracing system, according to an embodiment, including a further component.

FIG. 3 is a block diagram of an example collaborative workflow tracing system 1 100, according to an embodiment, including a further component. The further component is an extraction engine 140 that accesses a model repository resource 152 including a global model of collaborative workflow resource 154, a local model of collaborative workflow resource 156, and an executable tasks resource 158. The extraction engine 140 has as output the SVG model resource 124 that describes the initial state of the collaborative workflow, the get request resource 144, the communications resource 146, and the command set resource 122.

The extraction engine 140 may be activated prior to starting an instance of the collaborative workflow, for example, at design time of the collaborative workflow. The extraction engine 140 may be used because in a distributed architecture for viewing the collaborative workflow the output resources describe a combination of local elements and global elements of the collaborative workflow. Such a combination may be complicated and susceptible for errors because for example the global model of the global part of the collaborative workflow may be required to be consistent for all tracing systems used. Therefore, a generation of the output resources of the extraction engine allow for an efficient and error reducing preparation for tracing instances of the collaborative workflow. The generation of the output resources may be used by different participants of the collaborative workflow to install a collaborative workflow tracing system according to an embodiment.

The extraction engine 140 is configured to generate the command set resource 122 with the mapping. This may be accomplished by using a template that describes standard visualisations to apply for a workflow progress. This may further be accomplished by using information about endpoints of further participants of the collaborative workflow and how to contact the further participants. The extraction engine 140 may further use a set of possible get requests that represent a local event or a global event. From such input a mapping may be created that identifies get requests and the source of the get requests and relates this to a set of commands to modify an SVG model.

The extraction engine 140 may be further configured to generate an initial instance state of the model of the collaborative workflow using a definition of the local model of the collaborative workflow and a definition of the global model of the collaborative workflow. In the example, the model is the SVG model that is stored in the SVG model resource 124. For generating the SVG model resource 124 the global model of collaborative workflow resource 154 and the local model of collaborative workflow resource 156 may be used as input. The resulting SVG model resource 124 may then contain as detailed information about instances of the collaborative workflow as possible without using data that are considered as private by further participants of the collaborative workflow.

In the example, the extraction engine 140 is also configured to generate a resource of data items. Each data item has data that represents an event of the local workflow part and each data item is configured to be sent from an application modelled by the local workflow part. In the example, the resource of the data items is the get request resource 144. The get request resource 144 may also be used as an input to compute the command set resource 122. The extraction engine 140 may also implement the get requests that represent local events in the weaver 242 of the local application 1 240. In this way, a consistency of the get requests when tracing instances of the collaborative workflow may be ensured. The get request resource 144 may be generated from the executable tasks resource 158. Furthermore, the get request resource 144 may include get requests that are received from remote event collectors of further participants. In such a case, also the global model of the collaborative workflow resource 154 may be used as input.

The extraction engine 140 may be configured to generate the communications resource 146. The communications resource 146 has communication addresses and contact data of one or more remote event collectors. Data representing global events may be received from the one or more remote event collectors or may be sent to the one or more event collectors. The communications resource 146 may be generated from the global model of the collaborative workflow resource 154 and the local model of the collaborative workflow resource 156.

Figure 4:
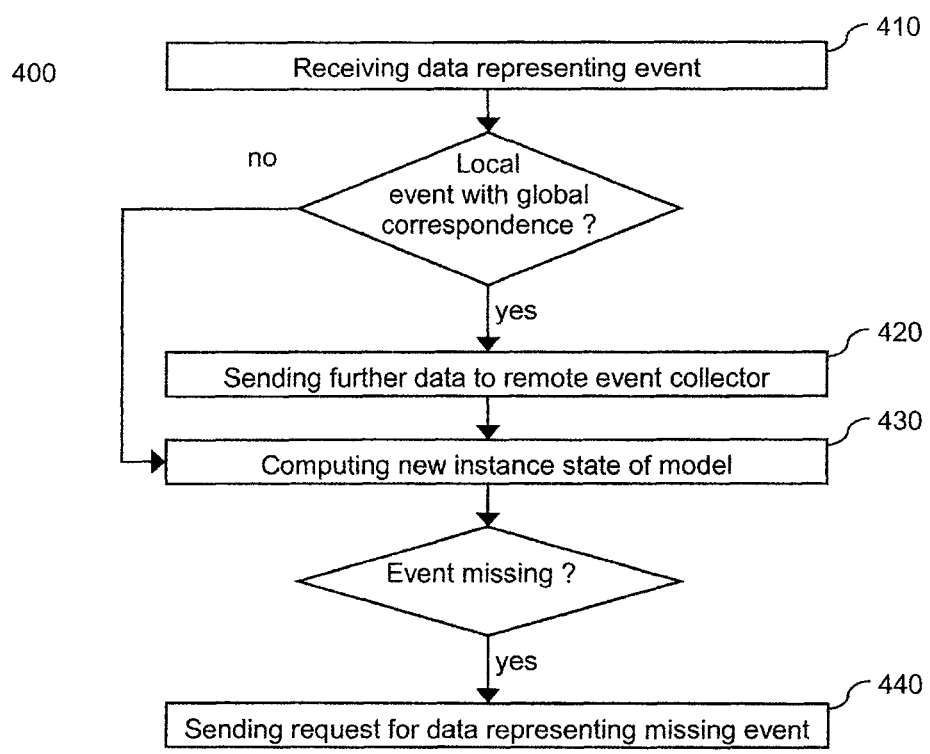
FIG. 4 is flow diagram of an example method according to an embodiment.

FIG. 4 is flow diagram of an example method 400 according to an embodiment. The method 400 may be a computer-implemented method for tracing a collaborative workflow.

The method 400 includes receiving 410 data that represents an event of the collaborative workflow. The collaborative workflow has a local workflow part and a global workflow part. It may follow determining if the event that is represented by the received data is a local event or a global event. This may be accomplished for example by determining the source from which the data have been received. In a further example, identifiers of the event may allow for a determination if the event is modelled in a local model or if the event is modelled in a global model. The local model represents the local part of the collaborative workflow and the global model represents the global part of the collaborative workflow.

When the check if the received data represent a local event with global correspondence gives a positive result the method may further include sending 420 further data to a remote event collector. A local event with a global correspondence may be a local event that coincides for example with a finishing of a global task. The local event may still contain more detailed information than the global event and therefore a filtering of the data representing the local event may be done in order to determine the further data that are sent to the remote event collector. The further data represent the event as an event of the global workflow part of the collaborative workflow. This allows for a remote collaborative workflow tracing system having the remote event collector to trace the collaborative workflow according to an embodiment. The further data are filtered from the data representing the local event so that the further data comply with local security requirements.

Independent from the fact if the received data represent a local event of a global event, computing 430 a new instance state of a model of the collaborative workflow may follow. The new instance state represents an instance of the collaborative workflow obtained through the event of the collaborative workflow. Furthermore, the new instance state complies with rules of a local model of the local workflow part and with rules of a global model of the global workflow part.

When a missing event is identified the method 400 may include sending 440 a request for data representing the missing event of the collaborative workflow to a remote event collector. This may require that the event of the collaborative workflow that is represented by the received data is configured to identify the missing event of the collaborative workflow. This may be the case when for example the missing event is required to have been finished prior to the event that is represented by the received data.

Computing 430 the new instance state may include accessing the command set resource 122 (see FIG. 2) with a mapping. The mapping relates the data representing the event of the collaborative workflow to a list of commands that describe changes of an outdated instance state of the model of the collaborative workflow to the new instance state of the model of the collaborative workflow.

The method 400 may include generating different resources such as the command set resource 122, an initial instance state of the SVG model resource 124 (see FIG. 2), a communications resource 146 (see FIG. 2), and a resource of data items 144 (see FIG. 2). The resources may be generated prior to beginning to trace any collaborative workflows.

The resource 124 with the initial instance state of the SVG model may be generated using a definition of the local model of the collaborative workflow and a definition of the global model of the collaborative workflow. Regarding the resource of data items 144, each data item has data that represents an event of the local workflow part and is configured to be sent from an application modelled by the local workflow part. In an example, each data item may be identical to a HTTP get request. The communications resource 146 may have communication addresses and contact data of one or more remote event collectors. This allows for the event collector 110 (see FIG. 2) sending data representing a global event to a remote collector. Furthermore, this allows for a simplified identification of global events represented by received data.

Figure 5:
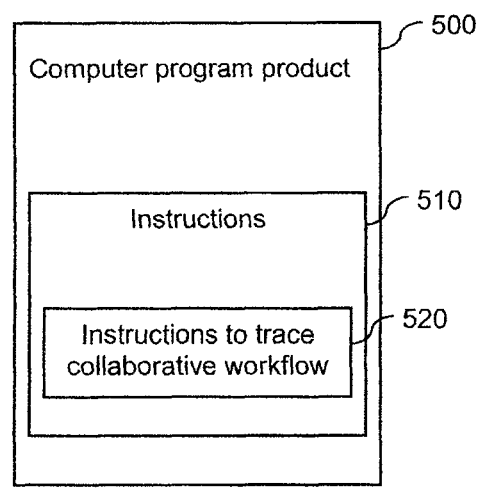
FIG. 5 is block diagram of an example computer program product according to an embodiment.

FIG. 5 is block diagram of an example computer program product 500 according to an embodiment. The computer program product 500 has instructions 510 including instructions 520 that are configured to cause a computer system to execute operations of any embodiments of the method 400 (see FIG. 4).

In one example embodiment, the instructions 520 to trace a collaborative workflow include instructions of an event collector module. The event collector module may be configured implement a receiving operation on the computer system. The receiving operation includes receiving data that represents an event of the collaborative workflow. The collaborative workflow has a local workflow part and a global workflow part.

The instructions 520 to trace a collaborative workflow include instructions of a transition engine module. The transition engine module may be configured to implement a computing operation on the computer system. The computing operation includes computing a new instance state of a model of the collaborative workflow. The new instance state represents an instance of the collaborative workflow obtained through the event of the collaborative workflow. Furthermore, the new instance state complies with rules of a local model of the local workflow part and with rules of a global model of the global workflow part.

Example embodiments of the computer program products may be stored on computer-readable media for carrying or having computer-executable instructions or data structures. Such computer-readable media may be any available media that can be accessed by a general purpose or special purpose computer. By way of example, such computer-readable media may include RAM, ROM, EPROM, EEPROM, CD-ROM or other optical disk storage, magnetic disk storage or other magnetic storage devices, or any other medium that may be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is an example of a computer-readable medium. Combinations of the above are also to be included within the scope of computer-readable media. Computer-executable instructions include, for example, instructions and data which cause a general purpose computer, a special purpose computer, or a special purpose processing device to perform a certain function or group of functions. Furthermore, computer-executable instructions include, for example, instructions that have to be processed by a computer to transform the instructions into a format that is executable by a computer. The computer-executable instructions may be in a source format that is compiled or interpreted to obtain the instructions in the executable format. When the computer-executable instructions are transformed, a first computer may for example transform the computer-executable instructions into the executable format and a second computer may execute the transformed instructions. The computer-executable instructions may be organized in a modular way so that a part of the instructions may belong to one module and a further part of the instructions may belong to a further module. However, the differences between different modules may not be obvious and instructions of different modules may be intertwined.

Example embodiments have been described in the general context of method operations which may be implemented in one embodiment by a computer program product including computer-executable instructions, such as program code, executed by computers in networked environments. Generally, program modules include for example routines, programs, objects, components, or data structures that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such operations.

Some embodiments may be operated in a networked environment using logical connections to one or more remote computers having processors. Logical connections may include for example a local area network (LAN) and a wide area network (WAN). The examples are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, handheld devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing the overall system or portions might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, hardware implementations, or equipment for receiving manual inputs.

What is claimed is:

1. A system for tracing a collaborative workflow, the system comprising:
    a processing unit;
    an event collector configured to receive data that represents an event of the collaborative workflow, the collaborative workflow having a local workflow part and a global workflow part; and
    a transition engine configured to compute, using the processing unit, a new instance state of a model of the collaborative workflow, the new instance state representing an instance of the collaborative workflow obtained through the event of the collaborative workflow and the new instance state complying with rules of a local model of the local workflow part and with rules of a global model of the global workflow part, the transition engine computing the new instance state of the model of the collaborative workflow by accessing a command set resource having a mapping of the data representing the event to a list of commands.

2. The system of claim 1, the event collector further being configured to send further data representing the event as an event of the global workflow part of the collaborative workflow to a remote event collector based on the event being an event of the local workflow part of the collaborative workflow.

3. The system of claim 2, wherein the further data comply with local security requirements.

4. The system of claim 1, the event collector further being configured to send a request for data representing a missing event of the collaborative workflow to a remote event collector based on the event of the collaborative workflow being configured to identify the missing event of the collaborative workflow.

5. The system of claim 1, wherein the list of commands describes changes of an outdated instance state of the model of the collaborative workflow to the new instance state of the model of the collaborative workflow.

6. The system of claim 5, further comprising an extraction engine configured to generate the command set resource with the mapping.

7. The system of claim 1, further comprising an extraction engine configured to generate an initial instance state of the model of the collaborative workflow using a definition of the local model of the collaborative workflow and a definition of the global model of the collaborative workflow.

8. The system of claim 1, further comprising an extraction engine configured to generate a resource of data items, each data item having data that represents an event of the local workflow part and being configured to be sent from an application modelled by the local workflow part.

9. The system of claim 1, further comprising an extraction engine configured to generate a communications resource, the communications resource having communication addresses and contact data of one or more remote event collectors.

10. The system of claim 1, wherein the model of the collaborative workflow is described in a resource using a scalable vector graphics language.

11. A computer-implemented method of tracing a collaborative workflow, the method comprising:
    receiving data that represents an event of the collaborative workflow, the collaborative workflow having a local workflow part and a global workflow part; and
    computing, using a processing unit, a new instance state of a model of the collaborative workflow by accessing a command set resource having a mapping of the data representing the event to a list of commands, the new instance state representing an instance of the collaborative workflow obtained through the event of the collaborative workflow and the new instance state complying with rules of a local model of the local workflow part and with rules of a global model of the global workflow part.

12. The method of claim 11, further comprising sending further data representing the event as an event of the global workflow part of the collaborative workflow to a remote event collector based on the event being an event of the local workflow part of the collaborative workflow.

13. The method of claim 12, wherein the further data comply with local security requirements.

14. The method of claim 11, further comprising sending a request for data representing a missing event of the collaborative workflow to a remote event collector based on the event of the collaborative workflow being configured to identify the missing event of the collaborative workflow.

15. The method of claim 11, wherein the list of commands describes changes of an outdated instance state of the model of the collaborative workflow to the new instance state of the model of the collaborative workflow.

16. The method of claim 15, further comprising generating the command set resource with the mapping.

17. The method of claim 11, further comprising generating an initial instance state of the model using a definition of the local model of the collaborative workflow and a definition of the global model of the collaborative workflow.

18. The method of claim 11, further comprising generating a resource of data items, each data item having data that represents an event of the local workflow part and being configured to be sent from an application modeled by the local workflow part.

19. The method of claim 11, further comprising generating a communications resource, the communications resource having communication addresses and contact data of one or more remote event collectors.

20. The method of claim 11, wherein the model of the collaborative workflow is described in a resource using a scalable vector graphics language.

21. A non-transitory computer-readable medium storing instructions, which when executed by a processing unit, provide a method comprising:
receiving data that represents an event of the collaborative workflow, the collaborative workflow having a local workflow part and a global workflow part; and
computing a new instance state of a model of the collaborative workflow by accessing a command set resource having a mapping of the data representing the event to a list of commands, the new instance state representing an instance of the collaborative workflow obtained through the event of the collaborative workflow and the new instance state complying with rules of a local model of the local workflow part and with rules of a global model of the global workflow part.

* * * * *